Patented Oct. 14, 1930

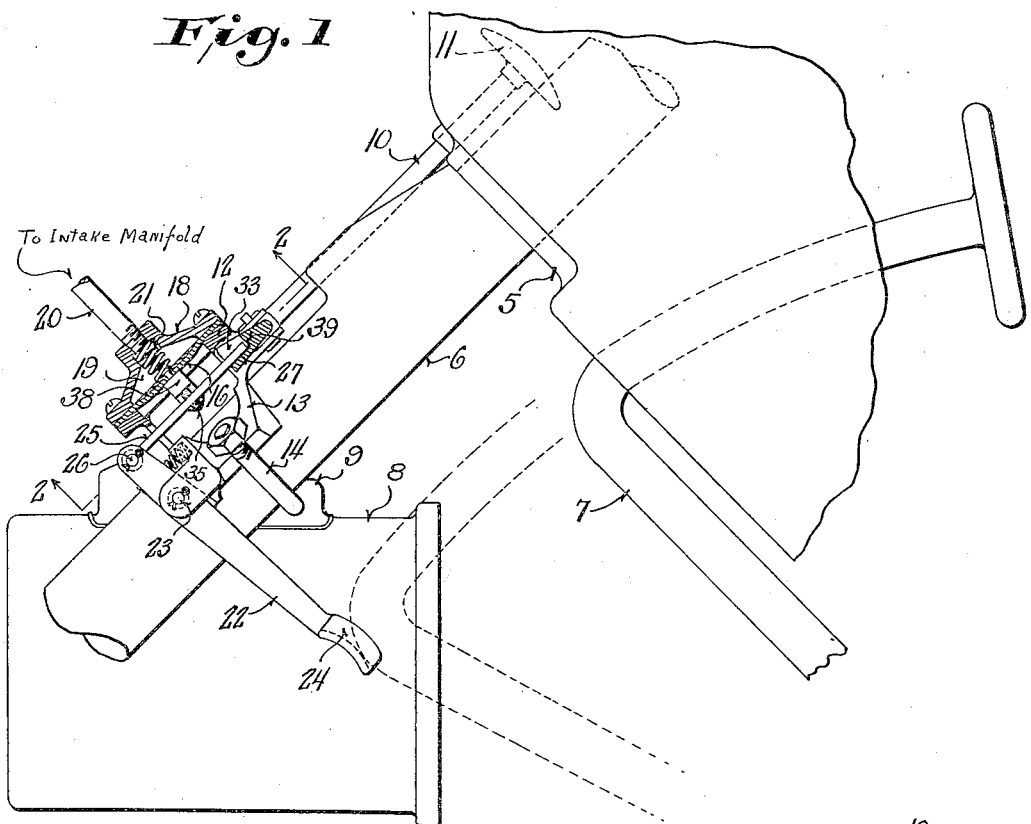

1,778,347

UNITED STATES PATENT OFFICE

BURTON S. AIKMAN, OF MILWAUKEE, WISCONSIN

STARTER CONTROL

Application filed July 25, 1929. Serial No. 380,923.

The invention relates to starting switch control apparatus for automotive vehicles.

The object of the invention is to provide mechanism for automatically closing the circuit of the starting motor through the actuation of the clutch pedal so that the operator is relieved of the separate duty of operating the starter switch, said mechanism, however, including an automatically disconnectible connection for preventing operation of the starter switch by the clutch pedal after the engine is running, said disconnectible connection preventing any possibility of the parts of the control and starter switch from being damaged in case the operator tries to operate them through his operation of the clutch pedal when the engine is running.

Devices of this kind to be practical should be capable of ready installation on motor cars now in use without material alteration or fitting and a further object of this invention is to provide a starter switch control apparatus that may be readily secured to the steering post of an automotive vehicle in a position for actuation by the clutch pedal and to act upon the starter switch already on the vehicle.

The invention further consists in the several features hereinafter set forth and more particularly defined by claims at the conclusion hereof.

In the drawings Fig. 1 is a view of control apparatus embodying the invention, showing it applied to an automotive vehicle, parts being shown in section;

Fig. 2 is a detail sectional view taken on the line 2—2 of Fig. 1;

Fig. 3 is a plan view as viewed along the line 3—3 of Fig. 2, with parts shown in section;

Fig. 4 is a detail sectional view taken on the line 4—4 of Fig. 3.

Referring to the drawings, the numeral 5 designates the dash portion of a vehicle adjacent the driver's seat, 6 the steering post, 7 the clutch pedal, 8 the starting motor, 9 the starter switch mechanism and 10 the rod or actuator for the starter switch mechanism as the same is constructed and arranged in Model A Ford automobiles, which is well known, and in this construction depression on the rod 10, by pressure exerted on the top button 11, acts to close the starter switch and thus start the motor 8 and through the usual actuating connections start the engine. In order to relieve the operator of the necessity of separately operating the starter rod 10, as during the engine starting operations, and, if desired, to do away with a separate manual operation of this rod 10 by the button 11, the control mechanism embodying the invention has been provided, comprising a mounting frame 12 provided with a split collar clamping arrangement formed of the part 13 integral with the mounting frame and a U-bolt 14, which parts are adapted to receive the steering post 6 between them and to be clamped thereto by tightening the nuts 15 on the bolt 14.

The mounting frame 12 has a flexible diaphragm 16 mounted between an annular portion 17 of the mounting frame and a housing portion 18, said diaphragm cooperating with said housing to provide a vacuum chamber 19 adapted to be connected with the intake system of the engine by a pipe 20, a spring 21 being mounted in said housing 18 to bear against the diaphragm 16 and normally urge it to a position to render the control operative.

The means for operating the starter switch mechanism from the clutch pedal 7 includes a lever 22 pivoted on a pin 23 carried by the portion 13 of the mounting frame and having a curved or channelled end 24 disposed in the path of movement of the clutch pedal so as to be engaged thereby after the operator has moved the clutch to a release position. The other end of the lever 22 is connected to a disconnectible link or rod 25 adapted to seat in a pocket or recess 27 at one end of a lever 28 and to engage the bottom of said recess to move said lever 28 when the pedal-operated lever 22 is moved. The lever 28 is pivoted intermediate its ends upon a pin 29 mounted in spaced ears 30 projecting from the annular portion 17 of the mounting frame and its free end 31 is forked to fit around the starter switch actuating rod 10 and engage nuts 32 adjustably mounted on said rod forming a shoulder for engaging said lever 28 so that the movement of said lever toward the starting motor 8 acts to operate the starter switch in the same way that pushing down on the button 11 acts to operate said switch, this downward movement of the free end 31 of the lever 28 being accomplished by the downward swinging movement of the lever 22 and the upward movement of the rod 25. Thus the operator of the vehicle, at the time he throws out his clutch as incidental to the usual starting operations, by a slight continued movement of the pedal actuates the starter rod 10 and hence closes the starter switch to set the motor 8 in operation and through the gearing associated therewith starts the engine. To prevent such actuation of the starter mechanism when the engine is running, the actuating linkage between the clutch pedal 7 and the rod 10 is provided with a disconnectible connection which in the present instance is provided by the association of the rod 25 with the vacuum-operated diaphragm 16 and for this purpose the recess 27 has a slotted portion 33 permitting withdrawal of the free end of the rod 25 from abutting engagement with the lever 28, this withdrawal being effected by the connection of the rod 25 with the diaphragm 16 through a lever 34 having its free end provided with an eye 35 through which the rod 25 extends and pivoted on a pin 36, here shown as a cotter-pin, supported in the ears 37 of the annular portion 17, said rod, intermediate its ends, extending through an eyed member 38 which has a shank portion riveted to the central part of the diaphragm 16.

As soon as the engine is started the vacuum built up in the intake manifold of the engine and transmitted through the pipe 20 into the chamber 19 overcomes resistance of the spring 21, tending to hold the rod 25 in an operative position, and causes the diaphragm 16 to flex inwardly toward the pipe 20, thereby swinging the lever 34 inwardly and thereby pulling the free end of the rod 24 inwardly toward the pipe 20 and away from the stop portion 39 of the slot 33 so that even if the lever 22 is operated by the movement of the clutch pedal 7 the operating connection to this starter switch mechanism is disconnected and hence the starter switch cannot be operated while the engine is running and no danger of breakage of the connections controlling the starter switch mechanism through the clutch pedal is present.

Thus it will be observed that I have provided a mechanism permitting direct operation of the starter switch mechanism through the operation of the clutch pedal but that through disconnection of parts of this mechanism after the engine is running the operation of the clutch pedal is rendered ineffective to in any way damage the starter mechanism or the starter control.

I desire it to be understood that this invention is not to be limited to any specific form or arrangement of parts except in so far as such limitations are specified in the claims.

What I claim as my invention is:

1. In starter mechanism for automotive vehicles, the combination with the clutch pedal and the starter switch, of means for operating said starter switch by said pedal on its clutch-releasing movement, said means including parts having disconnectible connection, and means necessarily controlled by the engine for automatically disconnecting said parts when the engine is running.

2. In starter mechanism for automotive vehicles, the combination with the clutch pedal and the starter switch, of means for operating said starter switch by said pedal on its clutch-releasing movement, said means including parts having disconnectible connection, and vacuum-operated means connected with the intake system of the engine for effecting disconnection of said parts when the engine is running.

3. In starter mechanism for automotive vehicles, the combination with the clutch pedal, starter switch and steering post of the vehicle, of starter switch control mechanism detachably mounted on said steering post and including means forming an actuating connection between said pedal and starter switch operable by said pedal on its clutch-releasing movement, said means including parts having disconnectible connection, and means controlled by the engine for automatically disconnecting said parts when the engine is running.

4. In starter mechanism for automotive vehicles, the combination with the clutch pedal and the starter switch, of a support, a lever pivotally mounted on said support and disposed in the path of movement of the clutch pedal for movement thereby on its clutch releasing movement, a lever mounted on said support and associated with said starter switch, a disconnectible operating connection between said levers, and means controlled by the engine for automatically disconnecting said operating connection when the engine is running.

5. In starter mechanism for automotive vehicles, a starter switch control for mounting between the starter switch and the clutch pedal of the vehicle to provide an operating connection therebetween for operating said starter switch by said pedal on its clutch-releasing movement, said control including a pair of levers and a movable thrust connection therebetween having disconnectible connection with one of said levers, and vacuum-operated means controlled by the engine for moving said thrust connection to disconnected position when the engine is running.

6. In starter switch control for mounting between the starter switch and the clutch pedal of the vehicle, the combination of a pivoted lever operable by the clutch pedal on its clutch-releasing movement, a lever associated with the starter switch, a thrust link between said levers pivotally connected with one of the levers and having releasable connection with the other lever, and means automatically controlled by the engine for moving said link to disconnected position when the engine is running.

7. In starter switch control for mounting between the starter switch and the clutch pedal of the vehicle, the combination of a pivoted lever operable by the clutch pedal on its clutch-releasing movement, a lever associated with the starter switch, a thrust link between said levers pivotally connected with one of the levers and having release connection with the other lever, a lever for moving said link to disconnected position, and a diaphragm movable under the influence of the suction effect of the engine for actuating said last-named lever when the engine is running to effect disconnection of said link and prevent operation of said starter through the operation of the clutch pedal.

In testimony whereof, I affix my signature.

BURTON S. AIKMAN.